(12) United States Patent
Cho et al.

(10) Patent No.: US 11,682,757 B2
(45) Date of Patent: Jun. 20, 2023

(54) COMPOSITE ANODE ACTIVE MATERIAL, METHOD OF PREPARING THE COMPOSITE ANODE MATERIAL, AND LITHIUM SECONDARY BATTERY COMPRISING THE COMPOSITE ANODE ACTIVE MATERIAL

(71) Applicant: UNIST(ULSAN NATIONAL INSTITUTE OF SCIENCE AND TECHNOLOGY), Ulsan (KR)

(72) Inventors: Jaephil Cho, Ulsan (KR); Jaekyung Sung, Ulsan (KR); Seong Hyeon Choi, Ulsan (KR); Jiyoung Ma, Ulsan (KR); Yoonkwang Lee, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 503 days.

(21) Appl. No.: 16/063,230

(22) PCT Filed: Nov. 3, 2017

(86) PCT No.: PCT/KR2017/012392
§ 371 (c)(1),
(2) Date: Jun. 15, 2018

(87) PCT Pub. No.: WO2019/066129
PCT Pub. Date: Apr. 4, 2019

(65) Prior Publication Data
US 2019/0296336 A1    Sep. 26, 2019

(30) Foreign Application Priority Data

Sep. 26, 2017  (KR) .................. 10-2017-0124532

(51) Int. Cl.
*H01M 4/36*    (2006.01)
*C01B 32/05*   (2017.01)
(Continued)

(52) U.S. Cl.
CPC ............. *H01M 4/366* (2013.01); *C01B 32/05* (2017.08); *C01B 32/21* (2017.08); *C01B 33/02* (2013.01);
(Continued)

(58) Field of Classification Search
CPC .......... H01M 4/366; H01M 4/36; H01M 4/62; H01M 4/38; H01M 4/0428; H01M 4/386;
(Continued)

(56) References Cited

U.S. PATENT DOCUMENTS 9,548,490 B2    1/2017   Ku et al.
10,050,259 B2   8/2018   Shim et al.
(Continued)

FOREIGN PATENT DOCUMENTS

KR    10-2015-0078068    7/2015
KR    2015-0101310       9/2015
(Continued)

OTHER PUBLICATIONS

English translation of KR 20160031782.*
(Continued)

*Primary Examiner* — Kiran Quraishi Akhtar
(74) *Attorney, Agent, or Firm* — Klarquist Sparkman, LLP

(57) ABSTRACT

Provided is a composite anode active material including: a carbonaceous material; a metal alloyable with lithium, located on a surface of the carbonaceous material; and a silicon coating layer located on a surface of the carbonaceous material, on a surface of the metal alloyable with lithium, or a combination thereof.

13 Claims, 5 Drawing Sheets

(51) Int. Cl.

| | | |
|---|---|---|
| *C01B 32/21* | (2017.01) | |
| *C01B 33/021* | (2006.01) | |
| *H01M 4/04* | (2006.01) | |
| *H01M 4/38* | (2006.01) | |
| *H01M 4/587* | (2010.01) | |
| *H01M 4/62* | (2006.01) | |
| *H01M 10/0525* | (2010.01) | |
| *C01B 33/02* | (2006.01) | |
| *H01M 4/02* | (2006.01) | |

(52) U.S. Cl.
CPC ......... *C01B 33/021* (2013.01); *H01M 4/0428* (2013.01); *H01M 4/36* (2013.01); *H01M 4/38* (2013.01); *H01M 4/386* (2013.01); *H01M 4/587* (2013.01); *H01M 4/62* (2013.01); *H01M 4/625* (2013.01); *H01M 10/0525* (2013.01); *C01P 2004/03* (2013.01); *C01P 2004/64* (2013.01); *C01P 2004/80* (2013.01); *C01P 2006/40* (2013.01); *H01M 2004/027* (2013.01)

(58) Field of Classification Search
CPC ...... H01M 4/587; H01M 4/625; H01M 4/133; H01M 4/1393; H01M 4/1395; H01M 10/0525; C01B 33/02; C01B 32/05; C01B 32/21; C01B 33/021; C01B 32/00; C01P 2004/03; C01P 2004/64; C01P 2004/80; C01P 2006/40; C01P 2004/62; C09C 1/56
See application file for complete search history.

(56) References Cited

U.S. PATENT DOCUMENTS

| | | | | |
|---|---|---|---|---|
| 2002/0009646 | A1* | 1/2002 | Matsubara | H01M 4/366 |
| | | | | 429/231.8 |
| 2013/0089784 | A1* | 4/2013 | Cho | H01M 4/386 |
| | | | | 429/213 |
| 2015/0243969 | A1* | 8/2015 | Ku | H01M 4/134 |
| | | | | 429/231.5 |
| 2018/0269519 | A1 | 9/2018 | Jo et al. | |

FOREIGN PATENT DOCUMENTS

| | | | | |
|---|---|---|---|---|
| KR | 2015-0137946 A | | 12/2015 | |
| KR | 20150137946 | * | 12/2015 | .......... H01M 10/052 |
| KR | 20160031782 | * | 3/2016 | ............ H01M 10/05 |
| KR | 10-2016-0044969 | | 4/2016 | |
| KR | 20160044969 | * | 4/2016 | ............. C01B 32/05 |
| KR | 10-2017-0066819 A | | 6/2017 | |
| KR | 10-2017-0069163 | | 6/2017 | |
| WO | WO 2017/099456 A1 | | 6/2007 | |
| WO | WO2017099456 | * | 6/2017 | .......... H01M 10/052 |

OTHER PUBLICATIONS

English translation of KR20150137946.*
English translation of KR20160044969.*
English Translation of WO2017099456.*
Korean Intellectual Property Office, Office Action, dated Sep. 7, 2018, issued in Republic of Korea Patent Application No. 10-2017-0124532.
International Search Report and Written Opinion dated Apr. 1, 2019, issued by the Korean Intellectual Property Office in corresponding Patent Cooperation Treaty Application No. PCT/KR2017/012392.

* cited by examiner

COMPOSITE ANODE ACTIVE MATERIAL, METHOD OF PREPARING THE COMPOSITE ANODE MATERIAL, AND LITHIUM SECONDARY BATTERY COMPRISING THE COMPOSITE ANODE ACTIVE MATERIAL

TECHNICAL FIELD

The present disclosure relates to a composite anode active material, and an anode and lithium battery including the same.

BACKGROUND ART

Due to their high voltage and high energy density, lithium batteries are used in various applications. For example, lithium batteries with excellent discharge capacity and excellent lifespan characteristics are required for application in, for example, electric vehicles (e.g., hybrid electric vehicles (HEVs) and plug-in HEVs (PHEVs)) which can be operated at a high temperature, must be charged or discharged with a large amount of electricity, and must be used for a long period of time.

Carbonaceous materials are porous and undergo small volume changes during charging and discharging, and thus are stable. However, carbonaceous materials generally exhibit low battery capacity due to having a porous carbon structure. For example, when graphite, which is highly crystalline, is formed as $LiC_6$, it has a theoretical capacity of 372 mAh/g. In addition, this graphite has low rate capability.

In addition to these carbonaceous materials, metals alloyable with lithium may be used as anode active materials having high electrical capacities. An example of a metal alloyable with lithium is silicon (Si), tin (Sn), aluminum (Al), or the like. Among these metals, research on the use of ball-milled Si particles in an anode active material together with a carbonaceous material is actively ongoing.

However, in processes of preparing and using ball-milled Si particles, silicon oxide layers are formed on surfaces of the Si particles, and such silicon oxide layers have problems such as reduced initial efficiency.

In addition, a metal alloyable with lithium, such as Si, has high discharge capacity, but a rate of volume change of Si is about 3.7-fold during charging and discharging, and thus cracks may occur and lifespan characteristics may deteriorate in a Si-containing anode active material.

To address the above-described problems, there is still a need for an anode active material having high initial efficiency and excellent lifespan characteristics and a method of manufacturing the same.

DESCRIPTION OF EMBODIMENTS

Technical Problem

Provided is a novel anode active material.

Provided is a method of preparing the anode active material.

Provided is a lithium secondary battery including an anode including the anode active material.

Solution to Problem

According to an aspect of the present disclosure, a composite anode active material includes:

a carbonaceous material;

a metal alloyable with lithium, located on a surface of the carbonaceous material; and a silicon coating layer located on a surface of the carbonaceous material, on a surface of the metal alloyable with lithium, or a combination thereof.

According to another aspect of the present disclosure, a method of preparing a composite anode active material includes:

(a) preparing a composite anode active material precursor by mixing a mixture of a carbonaceous material and a metal alloyable with lithium; and (b) forming a silicon coating layer on a surface of the composite anode active material precursor, wherein the forming of the silicon coating layer is performed by depositing silicon through chemical vapor deposition (CVD) of a silane gas.

According to another aspect of the present disclosure, a lithium secondary battery includes:

an anode including the above-described anode active material;

a cathode; and an electrolyte.

Advantageous Effects of Disclosure

According to an embodiment, a lithium secondary battery including an anode including a composite anode active material including a silicon coating layer has high initial efficiency and excellent lifespan characteristics.

DESCRIPTION OF REFERENCE NUMERALS FOR MAIN ELEMENTS OF THE DRAWINGS

Figure 1:
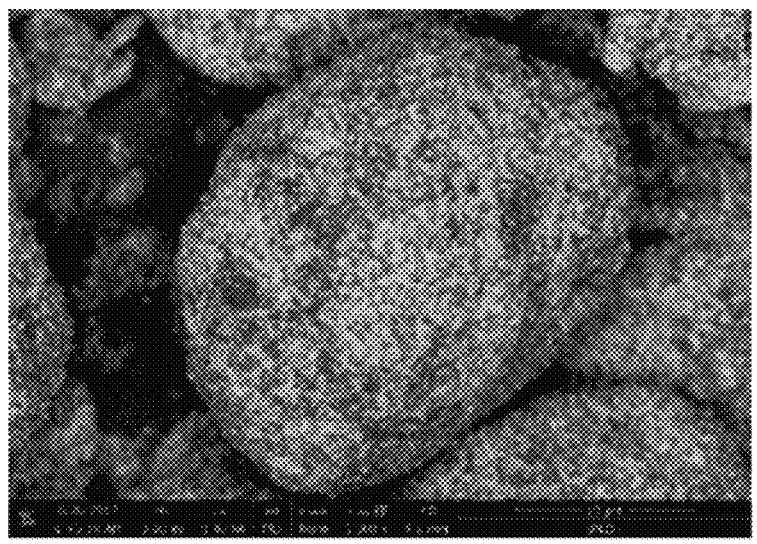
FIG. 1 is a scanning electron microscope (SEM) image of a composite anode active material precursor prepared according to Example 1.

| 1: Lithium battery | 2: Anode |
|---|---|
| 3: Cathode | 4: Separator |
| 5: Battery case | 6: Cap assembly |

BEST MODE

Hereinafter, a composite anode active material according to example embodiments, and a lithium secondary battery including an anode including the composite anode active material will be described in more detail.

A composite anode active material according to an embodiment includes: a carbonaceous material; a metal alloyable with lithium, located on a surface of the carbonaceous material; and a silicon coating layer located on a surface of the carbonaceous material, on a surface of the metal alloyable with lithium, or a combination thereof.

Since the composite anode active material includes the silicon coating layer on the surface of the carbonaceous material, the surface of the metal alloyable with lithium, or a combination thereof, the composite anode active material may have significantly increased capacity. In addition, in a case in which the same amount of silicon is included in the composite anode active material, the silicon coating layer is formed on the surface of the metal alloyable with lithium, and thus the silicon coating layer may be configured to a smaller thickness than that in a case in which the silicon coating layer is formed only on the surface of the carbonaceous material. Consequently, the thickness of the silicon coating layer is decreased due to the use of the composite anode active material, and, accordingly, stress due to expansion during charging and discharging may be reduced, resulting in enhanced lifespan characteristics.

In addition, since the silicon coating layer is formed on the surface of the metal alloyable with lithium, the thickness of the silicon coating layer may be maintained at the same level and a larger amount of silicon may be included in the composite anode active material, as compared to a case in which the silicon coating layer is formed only on the surface of the carbonaceous material. Accordingly, a capacity enhancement effect may be achieved without an increase in the thickness of the silicon coating layer.

The composite anode active material according to an embodiment may further include a dispersant.

Since the composite anode active material further includes a dispersant, the metal alloyable with lithium may be uniformly dispersed and arranged on the surface of the carbonaceous material. Since the metal alloyable with lithium is uniformly dispersed, a surface area, on which silicon particles can be deposited, is increased and, as a result, the thickness of the silicon coating layer may be uniformly maintained and the amount of silicon particles per unit area may be increased. Accordingly, the composite anode active material may exhibit significantly increased capacity.

In addition, since the metal alloyable with lithium is uniformly distributed on the surface of the carbonaceous material, the silicon coating layer may also be uniformly formed thereon, resulting in enhanced efficiency according to charging/discharging cycles.

The dispersant is non-conductive or conductive. According to one embodiment, the dispersant has conductivity. The dispersant enables uniform distribution of the metal alloyable with lithium and simultaneously provides a path for electron transfer between metals alloyable with lithium and carbonaceous materials, and thus enhances electrical conductivity. As a result, the composite anode active material according to an embodiment exhibits enhanced efficiency per cycle.

According to one embodiment, examples of the dispersant may include, but are not limited to, carbon black, acetylene black, Ketjen black, carbon fibers such as vapor-growth carbon fibers, graphite particulates, and a combination thereof, and the dispersant may be any dispersant capable of uniformly mixing an active material and a binder.

The carbonaceous material may be natural graphite, artificial graphite, hard carbon, soft carbon, or a combination thereof, but the present disclosure is not limited thereto. The carbonaceous material, which is capable of reversibly intercalating and deintercalating lithium ions, may be any material that is generally used in lithium secondary batteries and consists of carbon.

For example, the carbonaceous material may be spherical natural graphite or artificial graphite. For example, the carbonaceous material may be spherical natural graphite.

In the composite anode active material according to an embodiment, the metal alloyable with lithium may be distributed on the entire surface or a portion of the surface of the carbonaceous material. For example, the metal alloyable with lithium may be present on the surface of the carbonaceous material in the form of an island or superimposed thin films.

In the composite anode active material according to an embodiment, the metal alloyable with lithium is uniformly distributed on the surface of the carbonaceous material. Since the metal alloyable with lithium is uniformly dispersed, the thickness of the silicon coating layer may be uniformly maintained and a larger amount of silicon particles may be included in the composite anode active material, and, accordingly, it is possible to prepare a composite anode active material with high capacity and high initial efficiency.

In the composite anode active material according to an embodiment, the metal alloyable with lithium include: at least one metal selected from the group consisting of silicon (Si), tin (Sn), aluminum (Al), germanium (Ge), lead (Pb), zinc (Zn), silver (Ag), and gold (Au); an alloy, oxide, nitride, oxynitride, or carbide thereof; or a composite of the at least one metal with a carbonaceous material.

For example, the metal alloyable with lithium may include Si particles, Si oxide particles, or a combination thereof. The surface of the Si particles may be oxidized in air to thereby form Si oxide.

In the composite anode active material according to an embodiment, the metal alloyable with lithium may be non-spherical Si particles. For example, the metal alloyable with lithium may be amorphous Si particles.

A median particle diameter ($D_{50}$) of the amorphous Si particles may range from about 20 nm to about 300 nm, and may be a range expressed as two arbitrary values selected from the above range.

For example, the median particle diameter ($D_{50}$) of the amorphous Si particles ranges from about 25 nm to about 300 nm. For example, the median particle diameter ($D_{50}$) of the amorphous Si particles ranges from about 30 nm to about 300 nm. For example, the median particle diameter ($D_{50}$) of the amorphous Si particles ranges from about 35 nm to about 300 nm. For example, the median particle diameter ($D_{50}$) of the amorphous Si particles ranges from about 40 nm to about 300 nm. For example, the median particle diameter ($D_{50}$) of the amorphous Si particles ranges from about 45 nm to about 300 nm. For example, the median particle diameter ($D_{50}$) of the amorphous Si particles ranges from about 50 nm to about 300 nm. For example, the median particle diameter ($D_{50}$) of the amorphous Si particles ranges from about 20 nm to about 290 nm. For example, the median particle diameter ($D_{50}$) of the amorphous Si particles ranges from about 20 nm to about 280 nm. For example, the median particle diameter ($D_{50}$) of the amorphous Si particles ranges from about 20 nm to about 270 nm. For example, the median particle diameter ($D_{50}$) of the amorphous Si particles ranges from about 20 nm to about 260 nm. For example, the median particle diameter ($D_{50}$) of the amorphous Si particles ranges from about 20 nm to about 250 nm.

The median particle diameter ($D_{50}$) of the Si particles may be adjusted according to progress time of a ball-milling process, and when the median particle diameter ($D_{50}$) of the Si particles is within the above range, high capacity and excellent lifespan characteristics are secured. For example, when the median particle diameter ($D_{50}$) of the Si particles is less than 20 nm by the ball-milling process, silicon oxide films are formed on surfaces of Si particles during the ball-milling process, and thus it is difficult to maintain the shape of Si particles, and consequently, it is difficult to be used as a material for a composite anode active material. When the median particle diameter ($D_{50}$) of Si particles obtained by the ball-milling process is greater than 300 nm, lifespan characteristics are deteriorated due to high stress during charging and discharging.

In the composite anode active material according to an embodiment, the silicon coating layer includes amorphous or quasi-crystalline Si particles. In this case, the silicon coating layer has less risk for breakdown of crystals according to volume expansion and may maintain a stable structure. Unlike crystalline silicon, amorphous or quasi-crystalline silicon undergoes uniform volume expansion due to no direction in which lithium ions are intercalated and exhibits a high lithium transfer rate. Amorphous or quasi-crystalline silicon has less stress or strain acting on intercalation or deintercalation of lithium compared to crystalline silicon, and thus may maintain a stable structure in charging and discharging processes.

In the composite anode active material according to an embodiment, the silicon coating layer has a thickness of about 3 nm to about 50 nm. When the thickness of the silicon coating layer is within the above range, the silicon coating layer is in the form of a very thin film, and thus volume expansion may be suppressed during charging and discharging, and rate capability is also significantly enhanced. When the thickness of the silicon coating layer is less than 3 nm, it is difficult to expect a sufficient capacity enhancement effect, and when the thickness of the silicon coating layer is greater than 50 nm, deintercalation of Si particles due to volume expansion during charging and discharging occurs, and thus capacity and rate capability are deteriorated.

In addition, in a general anode active material for a lithium secondary battery, a slurry is prepared by mixing different materials together, and thus layer separation of an active material according to a volume change may occur in charging and discharging processes. However, the silicon coating layer is bound in the form of a thin film to the metal alloyable with lithium and/or the carbonaceous material, and thus layer separation during charging and discharging may be prevented. As a result, rapid charging and discharging are facilitated.

The composite anode active material according to an embodiment may further include a carbon coating layer on the outermost surface thereof.

The carbon coating layer may include amorphous carbon. For example, carbon included in the coating layer may be a calcined product of a carbon precursor. The carbon precursor may be any carbonaceous material that may be used in the art and is obtained by calcination. For example, the carbon precursor may be at least one selected from the group consisting of a polymer, coal tar pitch, petroleum pitch, meso-phase pitch, cokes, low molecular weight heavy oil, a coal-based pitch, and a derivative thereof. Since the carbon coating layer is formed on the outermost surface of the composite anode active material, contact between metal particles and an electrolyte solution, due to formation of a solid electrolyte interface (SEI) layer and selective passing of $Li^+$ ions may be prevented. In addition, the carbon coating layer suppresses volume expansion during charging and discharging and acts as a path for electron transfer in the composite anode active material, thus contributing to enhancement of electrical conductivity.

A thickness of the carbon coating layer may range from about 2 nm to about 5 μm, and may be a range expressed as two arbitrary values selected from the above range. When the thickness of the carbon coating layer is within the above range, electrical conductivity may be enhanced and volume expansion may also be sufficiently suppressed at the same time. When the thickness of the carbon coating layer is less than 2 nm, sufficient enhancement of electrical conductivity and functioning thereof as a buffer layer capable of accommodating volume expansion of Si cannot be expected. When the thickness of the carbon coating layer is greater than 5 μm, the carbon coating layer acts as a resistance when lithium is intercalated and deintercalated during charging and discharging, rate capability deteriorates.

Hereinafter, a method of preparing a composite anode active material, according to an embodiment, will be described.

The method of preparing a composite anode active material, according to an embodiment
includes:
(a) preparing a composite anode active material precursor by mixing a mixture of a carbonaceous material and a metal alloyable with lithium; and
(b) forming a silicon coating layer on a surface of the composite anode active material precursor,
wherein the forming of the silicon coating layer is prepared by depositing silicon through chemical vapor deposition (CVD) of a silane gas.

The method of preparing a composite anode active material may further include, before process (a), ball-milling the metal alloyable with lithium. Accordingly, the metal alloyable with lithium may be ball-milled nanoparticles. For example, the metal alloyable with lithium may be ball-milled Si particles.

The ball-milling process includes wet or dry ball-milling, and an appropriate ball-milling process may be selected by those of ordinary skill in the art according to the size and application of desired metal particles alloyable with lithium.

A medium used in wet ball-milling may be, for example, an organic solvent. For example, the medium includes isopropyl alcohol as a solvent, but the present disclosure is not limited thereto, and may be any medium that may be used for wet ball-milling in the art.

The ball-milling process may be performed at room temperature or lower. For example, the ball-milling process may be performed at 25° C. or less.

In process (a) of the method of preparing a composite anode active material, the mixture further includes a dispersant. A weight ratio of the metal alloyable with lithium:the dispersant:the carbonaceous material may be 1% to 15%:1% to 15%:70% to 98%, but the present disclosure is not limited thereto. For example, the weight ratio may be 1:1:98, 1:2:97, 2:2:96, 10:10:80, 15:15:70, 1:15:84, or 15:1:84, but the present disclosure is not limited thereto, and includes all arbitrary combinations within the above range.

In the method of preparing a composite anode active material, process (b) is performed by CVD using a silane-based gas at a temperature ranging from about 400° C. to about 600° C. When process (b) is performed at less than 400° C., the silicon coating layer may not be deposited, and when process (b) is performed at greater than 600° C., the silicon coating layer may be converted into a crystalline silicon film, and thus it is not suitable.

In process (b), a temperature for CVD may be appropriately selected from the above range in consideration of a desired thickness of the silicon coating layer.

The silane-based gas may be easily selected by those of ordinary skill in the art from any Si-based precursors capable of releasing Si atoms by gasification within the above temperature range that may be used in the art.

For example, the silane-based gas may be a Si-based precursor, such as silane ($SiH_4$), dichlorosilane ($SiH_2Cl_2$), silicon tetrafluoride ($SiF_4$), silicon tetrachloride ($SiCl_4$), methylsilane ($CH_3SiH_3$), disilane ($Si_2H_6$), or a combination thereof.

The method of preparing a composite anode active material further includes, after process (b), forming a carbon coating layer on an outermost surface of the composite anode active material precursor by providing a carbon precursor onto the composite anode active material precursor and heat-treating the carbon precursor. The heat treatment process is performed at a temperature ranging from about 800° C. to about 1,100° C. When the heat treatment process is performed within the above temperature range, the carbon coating layer may be formed from pyrolysis of the carbon precursor.

When the heat treatment temperature is less than 800° C., pyrolysis does not sufficiently occur, and when the heat treatment temperature is greater than 1,100° C., SiC is formed due to a side reaction between silicon and carbon of the carbon precursor, and thus capacity is decreased.

The heat treatment process may be performed for 1 hour or more. When the heat treatment process is performed for less than 1 hour, the carbon precursor is not sufficiently pyrolyzed, and thus it is difficult to form a uniform carbon coating layer.

The forming of the carbon coating layer may be performed in an inert atmosphere. For example, the forming of the carbon coating layer may be performed in an argon or nitrogen atmosphere. Through this, a uniform carbon coating layer may be introduced.

An anode for a lithium secondary battery, according to another embodiment, includes: an anode current collector; and an anode active material layer located on at least a surface of the anode current collector and including the above-described composite anode active material.

The anode may include a binder between the anode current collector and the anode active material layer or in the anode active material layer. The binder will be described below.

The anode and a lithium secondary battery including the same may be manufactured using the following methods.

The anode includes the above-described composite anode active material, and for example, may be fabricated by preparing a composite anode active material composition by mixing the above-described composite anode active material, a binder, and optionally a conductive material in a solvent, and then molding the composite anode active material composition into a certain shape or applying the composite anode active material composition onto a current collector such as copper foil or the like.

The binder used in the composite anode active material composition is a component assisting in binding between the composite anode active material and the conductive material and in binding of the composite anode active material to the current collector, may be included between the anode current collector and the anode active material layer or in the anode active material layer, and is added in an amount of about 1 part by weight to about 50 parts by weight with respect to 100 parts by weight of the composite anode active material. For example, the binder may be added in an amount of about 1 part by weight to about 30 parts by weight, about 1 part by weight to about 20 parts by weight, or about 1 part by weight to about 15 parts by weight, with respect to 100 parts by weight of the composite anode active material.

Examples of the binder include, but art not limited to, polyvinylidene fluoride, polyvinylidene chloride, polybenzimidazole, polyimide, polyvinyl acetate, polyacrylonitrile, polyvinyl alcohol, carboxymethylcellulose (CMC), starch, hydroxypropylcellulose, regenerated cellulose, polyvinyl pyrrolidone, tetrafluoroethylene, polyethylene, polypropylene, polystyrene, polymethylmethacrylate, polyaniline, acrylonitrile butadiene styrene, phenol resin, epoxy resin, polyethyleneterephthalate, polytetrafluoroethylene, polyphenylene sulfide, polyamideimide, polyetherimide, polyethersulfone, polyamide, polyacetal, polyphenyleneoxide, polybutyleneterephthalate, ethylene-propylene-diene terpolymer (EPDM), sulfonated EPDM, styrene-butadiene rubber (SBR), fluorine rubber, and various copolymers.

The anode may further include optionally a conductive material that provides a conductive path for the above-described composite anode active material to further enhance electrical conductivity. The conductive material may be any conductive material that may be generally used in lithium batteries, and may be, for example, a conductive material including: a carbonaceous material such as carbon black, acetylene black, Ketjen black, carbon fibers (e.g., vapor-grown carbon fibers), or the like; a metal-based material such as metal powder formed of copper, nickel, aluminum, silver, or the like, metal fibers, or the like; a conductive polymer such as polyphenylene derivatives or the like; or a mixture thereof.

The solvent may be N-methylpyrrolidone (NMP), acetone, water, or the like. The solvent is used in an amount of about 1 part by weight to about 10 parts by weight with respect to 100 parts by weight of the composite anode active material. When the amount of the solvent is within the above range, an operation for forming an active material layer is easy.

In addition, the current collector is generally fabricated to a thickness of 3 μm to 500 μm. The current collector is not particularly limited so long as it does not cause a chemical change in the fabricated battery and has conductivity. Examples of a material for forming the current collector include copper, stainless steel, aluminum, nickel, titanium, calcined carbon, copper or stainless steel that is surface-treated with carbon, nickel, titanium, silver, or the like, an alloy of aluminum and cadmium, or the like. In addition, the current collector may have fine irregularities on a surface thereof so as to enhance adhesion between the composite anode active material and the current collector, and may be used in any of various forms including a film, a sheet, a foil, a net, a porous structure, a foam, a non-woven fabric, and the like.

The prepared composite anode active material composition may be directly coated onto a current collector to form an anode plate, or may be cast onto a separate support and a composite anode active material film separated from the support is laminated on a copper foil current collector, to obtain an anode plate. However, the anode is not limited to the above-listed shapes and may have other shapes.

The composite anode active material composition may be used in manufacturing an electrode of a lithium battery, and may also be used in manufacturing a printable battery by being printed on a flexible electrode substrate.

Next, a cathode is prepared.

For example, a cathode active material composition, in which a cathode active material, a conductive material, a binder, and a solvent are mixed, is prepared. The cathode active material composition is directly coated onto a metal current collector to thereby manufacture a cathode plate. In another embodiment, the cathode active material composition may be cast onto a separate support, and then a film separated from the support may be laminated on a metal current collector to thereby manufacture a cathode plate. The cathode is not limited to the above-listed shapes and may have other shapes.

The cathode active material is a lithium-containing metal oxide and may be any cathode active material commonly used in the art without limitation. For example, the cathode active material may be at least one selected from composite oxides between lithium and metals selected from cobalt, manganese, nickel, and a combination thereof, and may be, for example, a compound represented by any one of the following formulae: $Li_aA_{1-b}B^1{}_bD^1{}_2$ where $0.90 \leq a \leq 1.8$ and $0 \leq b \leq 0.5$; $Li_aE_{1-b}B^1{}_bO_{2-c}D^1{}_c$ where $0.90 \leq a \leq 1.8$, $0 \leq b \leq 0.5$, and $0 \leq c \leq 0.05$; $LiE_{2-b}B^1{}_bO_{4-c}D^1{}_c$ where $0 \leq b \leq 0.5$ and $0 \leq c \leq 0.05$; $Li_aNi_{1-b-c}Co_bB^1{}_cD^1{}_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Co_bB^1{}_cO_{2-\alpha}F^1{}_\alpha$ where $0.90 \leq a \leq 1.8$, $0 \leq b \leq 0.5$, $0 \leq c \leq 0.05$, and $0 < \alpha < 2$; $Li_aNi_{1-b-c}Co_bB^1{}_cO_{2-\alpha}F^1{}_2$ where $0.90 \leq a \leq 1.8$, $0 \leq b \leq 0.5$, $0 \leq c \leq 0.05$, and $0 < \alpha < 2$; $Li_aNi_{1-b-c}Mn_bB^1{}_cD^1{}_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB^1{}_cO_{2-\alpha}F^1{}_\alpha$ where $0.90 \leq a \leq 1.8$, $0 \leq b \leq 0.5$, $0 \leq c \leq 0.05$, and $0 < \alpha < 2$; $LiaNi_{1-b-c}MnbB^1{}_cO_{2-\alpha}F^1{}_2$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ where $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiI^1O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the formulae above, A is nickel (Ni), cobalt (Co), manganese (Mn), or a combination thereof; B is aluminum (Al), Ni, Co, Mn, chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is Co, Mn, or a combination thereof; F is F, S, P, or a combination thereof; G is Al, Cr, Mn, Fe, Mg, lanthanum (La), cerium (Ce), strontium (Sr), V, or a combination thereof; Q is titanium (Ti), molybdenum (Mo), Mn, or a combination thereof; I is Cr, V, Fe, scandium (Sc), yttrium (Y), or a combination thereof; and J is V, Cr, Mn, Co, Ni, copper (Cu), or a combination thereof.

For example, the cathode active material may be $LiCoO_2$, $LiMn_xO_{2x}$ where x=1, 2, $LiNi_{1-x}Mn_xO_{2x}$ where $0 < x < 1$, $LiNi_{1-x-y}Co_xMn_yO_2$ where $0 \leq x \leq 0.5$ and $0 \leq y \leq 0.5$, $LiFePO_4$, or the like.

In addition, the above-listed compounds may have a coating layer on surfaces thereof, or a mixture of the compound and a compound having a coating layer may also be used. The coating layer may include a coating element compound such as an oxide, a hydroxide, an oxyhydroxide, an oxycarbonate, or a hydroxycarbonate of a coating element. The compounds constituting these coating layers may be amorphous or crystalline. The coating element included in the coating layer may be Mg, Al, Co, potassium (K), sodium (Na), calcium (Ca), silicon (Si), Ti, V, tin (Sn), germanium (Ge), gallium (Ga), boron (B), arsenic (As), zirconium (Zr), or a mixture thereof. The coating layer may be formed using any coating method (e.g., spray coating, dipping, or the like) that does not adversely affect physical properties of the cathode active material by using these elements in the compounds, and the coating methods may be well understood by one of ordinary skill in the art, and thus detailed description thereof will be omitted.

In the cathode active material composition, the conductive material, the binder, and the solvent may be the same as those used in the anode active material composition.

The amounts of the cathode active material, the conductive material, the binder, and the solvent may be the same as those generally used in a lithium secondary battery. At least one of the conductive material, the binder, and the solvent may not be used according to a use and constitution of lithium batteries.

Next, a separator to be inserted between the cathode and the anode is prepared.

The separator may be any separator commonly used in lithium batteries. The separator may have low resistance to migration of ions in an electrolyte and have an excellent electrolyte-retaining ability. For example, the separator is selected from glass fiber, polyester, Teflon™, polyethylene, polypropylene, polytetrafluoroethylene (PTFE), and combinations thereof, each of which may be a non-woven or woven fabric. For example, a rollable separator including polyethylene, polypropylene, or the like may be used for a lithium ion battery, and a separator with a good organic electrolytic solution-retaining ability may be used for a lithium ion polymer battery. For example, the separator may be manufactured according to the following method.

A polymer resin, a filler, and a solvent are mixed to prepare a separator composition. Then, the separator composition may be directly coated onto an electrode, and then dried to form a separator. In some embodiments, the separator composition may be cast onto a support and then dried, and then a separator film separated from the support is laminated on an electrode to form a separator.

The polymer resin used to manufacture the separator is not particularly limited, and may be any material used in a binder of an electrode plate. For example, the polymer resin may be a vinylidenefluoride/hexafluoropropylene copolymer, polyvinylidene fluoride (PVDF), polyacrylonitrile, polymethylmethacrylate, a mixture thereof, or the like.

Next, an electrolyte is prepared.

For example, the electrolyte may be an organic electrolyte solution. In addition, the electrolyte may be in a solid phase. For example, the electrolyte may be boron oxide, lithium oxynitride, or the like, but the present disclosure is not limited thereto, and may be any electrolyte that may be used as a solid electrolyte in the art. The solid electrolyte may be formed on the anode by using a method such as sputtering or the like.

For example, the organic electrolyte solution may be prepared by dissolving a lithium salt in an organic solvent.

The organic solvent may be any solvent that may be used as an organic solvent in the art. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, a mixture thereof, or the like.

The lithium salt may be any material that may be used as a lithium salt in the art. For example, the lithium salt may be $LiPF_6$, $LiBF_6$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are natural numbers, LiCl, LiI, a mixture thereof, or the like.

Figure 8:
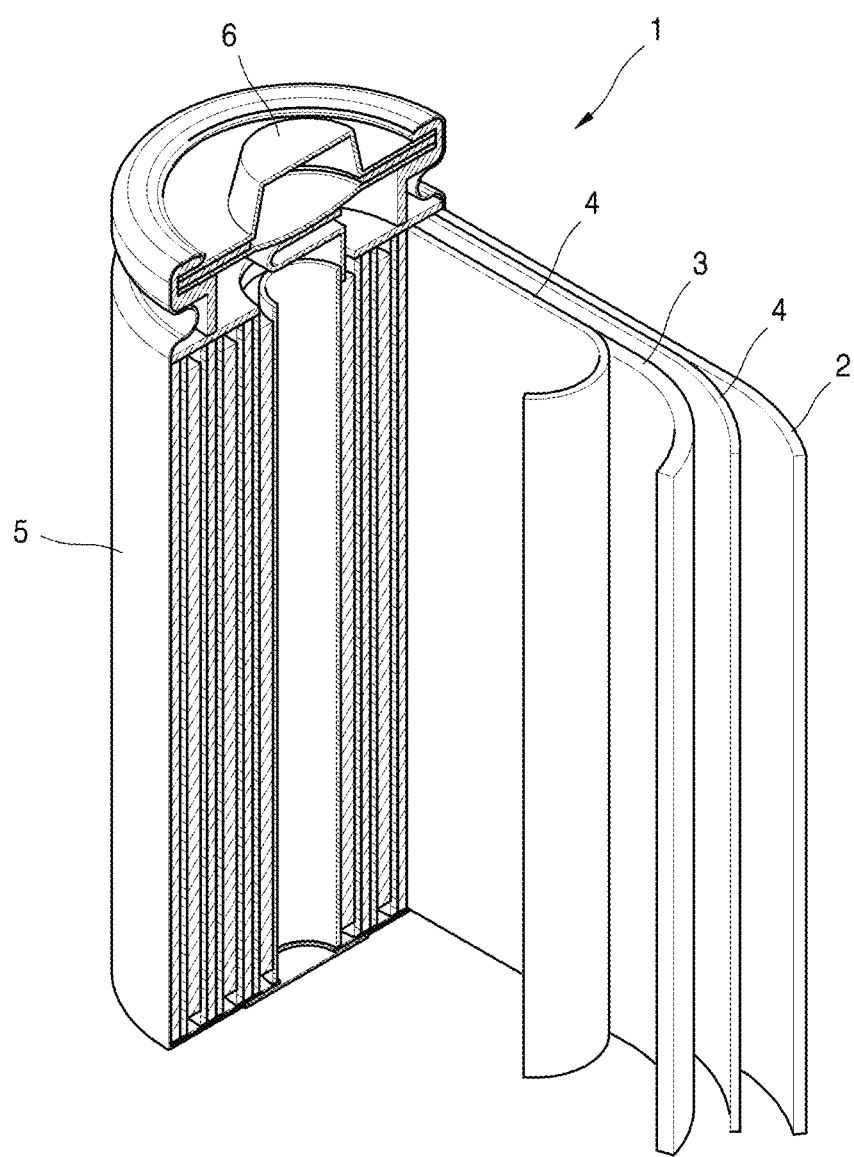
FIG. 8 is a view of a lithium battery according to an example embodiment.

As illustrated in FIG. 8, a lithium battery 1 includes a cathode 3, an anode 2, and a separator 4. The cathode 3, the anode 2, and the separator 4 are wound or folded, and then accommodated in a battery case 5. Subsequently, an organic electrolyte solution is injected into the battery case 5 and the battery case 5 is sealed with a cap assembly 6 to thereby complete the manufacture of the lithium battery 1. The battery case 5 may be of a cylindrical type, a rectangular type, a thin-film type, or the like. For example, the lithium battery 1 may be a thin-film type battery. The lithium battery 1 may be a lithium ion battery.

The separator may be located between the cathode and the anode to form a battery assembly. The battery assembly may be stacked in a bi-cell structure and impregnated with an organic electrolyte solution, and the resultant assembly may be put into a pouch and hermetically sealed, to thereby complete the manufacture of a lithium ion polymer battery.

In addition, a plurality of battery assemblies may be stacked to form a battery pack, which may be used in any device that requires high capacity and high output, for example, in a laptop computer, a smartphone, an electric vehicle, or the like.

In addition, the lithium battery has excellent lifespan characteristics and high rate capability, and is thus suitable for use in electric vehicles (EVs). For example, the lithium battery is suitable for use in hybrid vehicles such as plug-in hybrid electric vehicles (PHEVs) and the like. In addition, the lithium battery may be used in the field that requires storage of a large amount of power. For example, the lithium battery may be used in e-bikes, electric tools, and the like.

MODE OF DISCLOSURE

The present disclosure will now be described in further detail with reference to the following preparation example, examples, and comparative examples. However, these examples are provided for illustrative purposes only and are not intended to limit the scope of the present disclosure.

Preparation of Silicon (Si) Nanoparticles

Preparation Example 1

Commercially available bulk silicon was put in a ball-mill together with a medium, isopropyl alcohol (IPA), followed by pulverization at a low temperature (25° C. or less) and a ball-mill rotation speed of 3,000 rpm to 4,000 rpm for 2 hours, to thereby obtain ball-milled Si nanoparticles. The ball-milled Si nanoparticles had a median particle diameter ($D_{50}$) of 130 nm.

Preparation of Composite Anode Active Material Precursor

Example 1

The prepared Si nanoparticles, Super P™ as carbon black, and graphite were put into a mixer in a weight ratio of 5:2:93, and then mixed at a low temperature (25° C. or less) for 3 hours, to thereby obtain a composite anode active material precursor.

The composite anode active material precursor was subjected to vapor chemical deposition of $SiH_4(g)$ at a temperature of 475° C. and a rate of 50 sccm for 20 minutes, thereby forming a silicon coating layer on a surface of the composite anode active material precursor.

An SEM image of the obtained composite anode active material precursor can be confirmed in FIG. 1.

Example 2

The prepared Si nanoparticles, Super P™ as carbon black, and graphite were put into a mixer in a weight ratio of 7:5:88, and then mixed at a low temperature (25° C. or less) for 3 hours, to thereby obtain a composite anode active material precursor.

The composite anode active material precursor was subjected to vapor chemical deposition of $SiH_4(g)$ at a temperature of 475° C. and a rate of 50 sccm for 30 minutes, thereby forming a silicon coating layer on a surface of the composite anode active material precursor.

An SEM image of the obtained composite anode active material precursor can be confirmed in FIG. 1.

Comparative Example 1

The prepared Si nanoparticles and graphite were put into a mixer in a weight ratio of 12:88, and then mixed at a low temperature (25° C. or less) for 2 hours, to thereby obtain a composite anode active material precursor.

Figure 2:
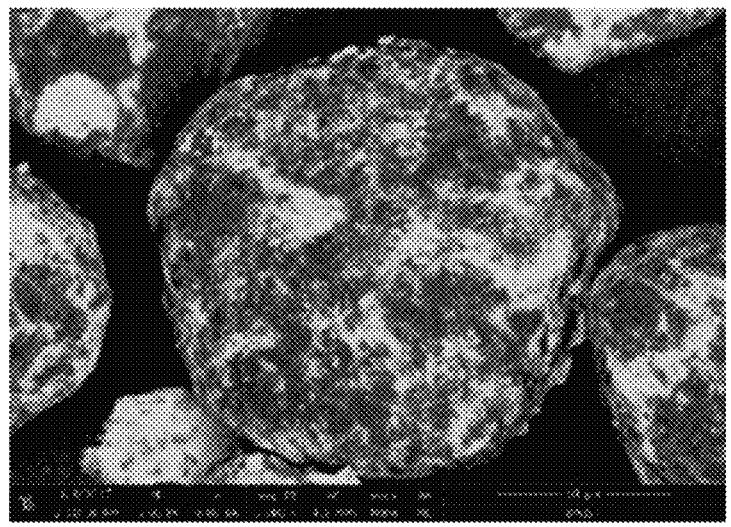
FIG. 2 is an SEM image of a composite anode active material precursor prepared according to Comparative Example 1.
Figure 3:
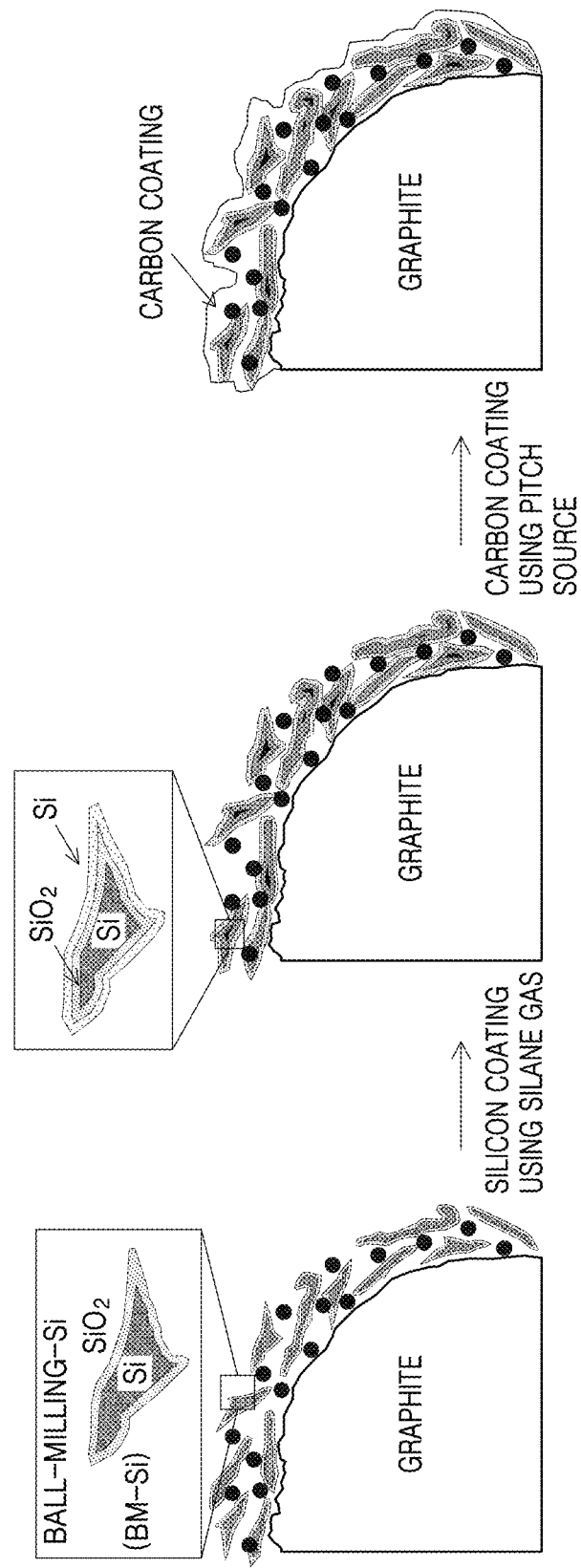
FIG. 3 illustrates a method of preparing a composite anode active material.
Figure 4:
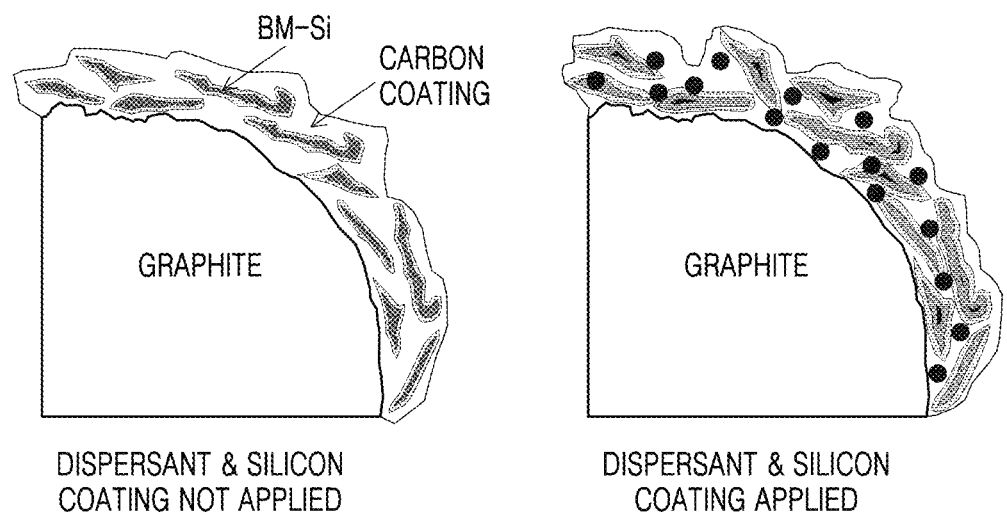
FIG. 4 illustrates composite anode active materials prepared according to Example 3 and Comparative Example 3.

An SEM image of the obtained composite anode active material precursor can be confirmed in FIG. 2.

Comparative Example 2

A composite anode active material precursor having a silicon coating layer on a surface thereof was obtained through chemical vapor deposition of $SiH_4(g)$ at a rate of 50 sccm for 30 minutes onto 10 g of graphite at 475° C.

Preparation of Composite Anode Active Material

Example 3

10 g of the composite anode active material precursor prepared according to Example 1 and 1.5 g of pitch were put into a mixer and mixed at 25° C. for 120 minutes, followed by heat treatment at 900° C. for 120 minutes, to thereby obtain a composite anode active material in which a carbon coating layer was formed on the outermost surface of the composite anode active material precursor.

Example 4

10 g of the composite anode active material precursor prepared according to Example 2 and 1.5 g of pitch were put into a mixer and mixed at 25° C. for 120 minutes, followed by heat treatment at 900° C. for 120 minutes, to thereby obtain a composite anode active material in which a carbon coating layer was formed on the outermost surface of the composite anode active material precursor.

Comparative Example 3

10 g of the composite anode active material precursor prepared according to Comparative Example 1 and 1.5 g of pitch were put into a mixer and mixed at 25° C. for 120 minutes, followed by heat treatment at 900° C. for 120 minutes, to thereby obtain a composite anode active material in which a carbon coating layer was formed on the outermost surface of the composite anode active material precursor.

Comparative Example 4

10 g of the composite anode active material precursor prepared according to Comparative Example 2 and 1.5 g of pitch were put into a mixer and mixed at 25° C. for 120 minutes, followed by heat treatment at 900° C. for 120 minutes, to thereby obtain a composite anode active material in which a carbon coating layer was formed on the outermost surface of the composite anode active material precursor.

Evaluation Example 1: Evaluation of Dispersivity of Si Nanoparticles

Surfaces of the composite anode active material precursors of Example 1 and Comparative Example 1 were observed through SEM images.

As shown in FIGS. 1 and 2, it can be confirmed that the composite anode active material precursor of Example 1 has a structure in which Si nanoparticles (expressed in white) are uniformly dispersed on a surface of graphite (expressed in black), whereas the composite anode active material of Comparative Example 1 has a structure in which a graphite surface having a large area (expressed in black) is exposed to the outside and Si nanoparticles are agglomerated with each other (expressed in white).

From these results, it is assumed that, in the composite anode active material precursor of Example 1, a dispersant is injected between Si nanoparticles to thereby suppress agglomeration of the Si nanoparticles, resulting in enhanced dispersibility of the Si nanoparticles.

(Manufacture of Half-Cell)

Example 5

A slurry was prepared using the composite anode active material of Example 3 as an anode active material, a conductive material, and a binder in a ratio of 95.8:1:3.2. At this time, Super P was used as the conductive material, and as the binder, carboxymethylcellulose (CMC) and styrene-butadiene-rubber (SBR) were used.

The slurry was uniformly applied onto copper foil and dried in an oven at 80° C. for about 2 hours, followed by roll pressing and further drying in a vacuum oven at 110° C. for about 12 hours, to thereby complete the manufacture of an anode.

The manufactured anode was used as a working electrode, lithium foil was used as a counter electrode, a polyethylene film as a separator was inserted between the anode and the counter electrode, and a liquid electrolyte prepared by adding 10.0 wt % of FEC to a mixed solvent of EC/EMC/DEC in a volume ratio of 3/5/2 and adding $LiPF_6$ as a lithium salt thereto to a concentration of 1.3 M was used, to manufacture a CR2016 half-cell according to a commonly known manufacturing process.

Example 6

A half-cell was manufactured in the same manner as in Example 5, except that the composite anode active material of Example 4 was used as an anode active material.

Comparative Example 5

A half-cell was manufactured in the same manner as in Example 5, except that the composite anode active material of Comparative Example 3 was used.

Comparative Example 6

A half-cell was manufactured in the same manner as in Example 5, except that the composite anode active material of Comparative Example 4 was used.

Evaluation Example 2: Electrochemical Characteristic Evaluation (1)

Figure 5:
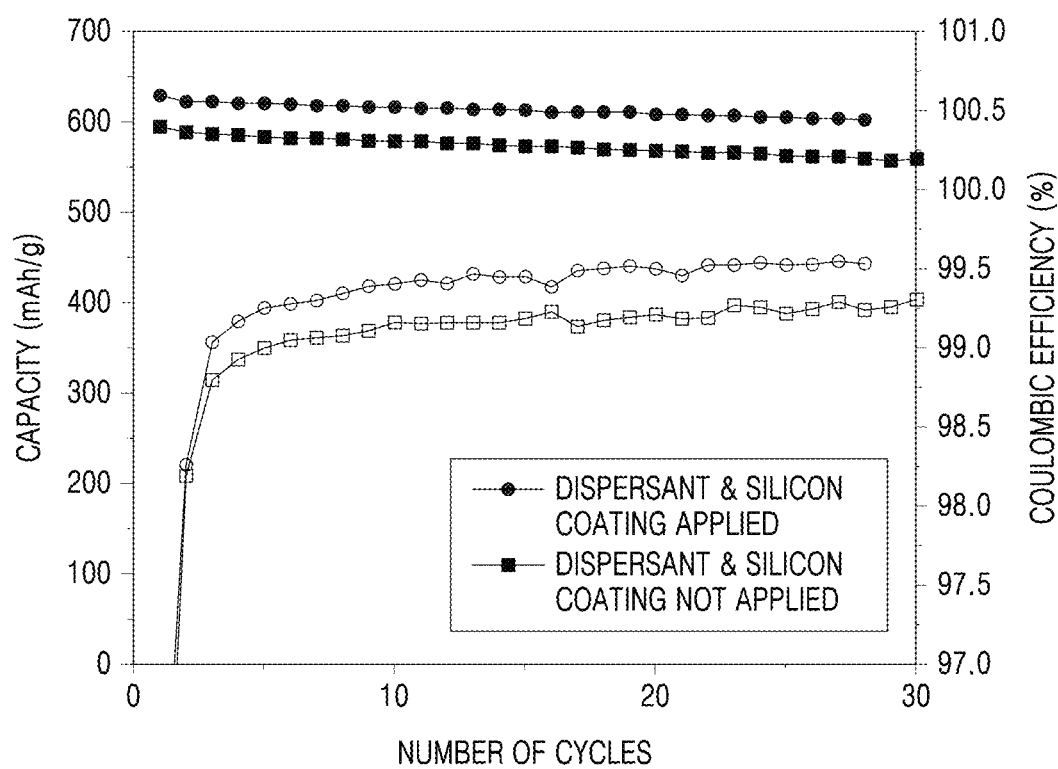
FIG. 5 is a graph showing electrochemical evaluation data of half-cells manufactured according to Example 5 and Comparative Example 5.
Figure 6:
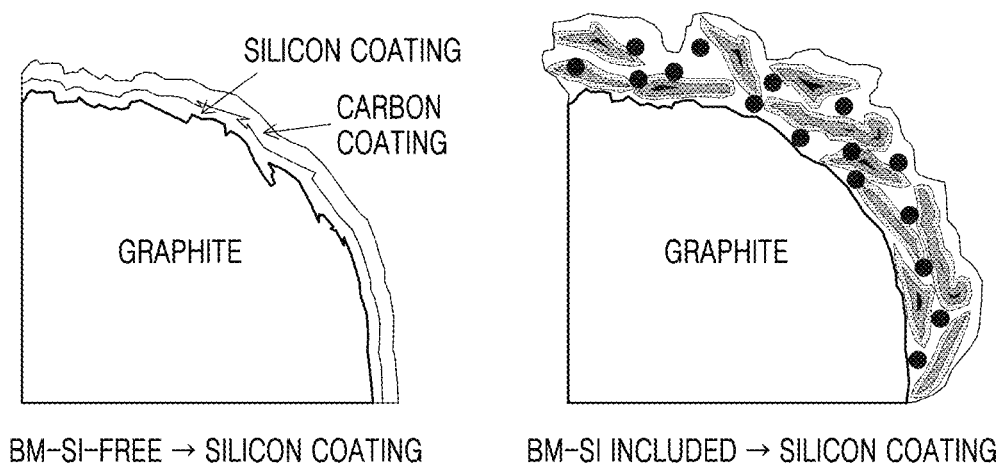
FIG. 6 illustrates composite anode active materials manufactured according to Example 4 and Comparative Example 4.

Each of the half-cells manufactured according to Example 5 and Comparative Example 5 started to be charged at 25° C. and a charge rate of 0.1 C-rate and charged until the voltage reached 0.01 V, and at this time, each half-cell was charged at a constant current and a constant voltage, and then charged at a constant voltage up to a certain current (0.01 C) or less. Subsequently, each half-cell was discharged at a constant current and a discharge rate of 0.1 C-rate until the voltage reached 1.5 V. As such, after two cycles of charging and discharging, 30 cycles of charging and discharging were continuously repeated at a charge/discharge rate of 0.5 C-rate and in a voltage range of 0.01 V to 1.5 V. A part of the charging/discharging experimental results is shown in Table 1 below, and a graph showing the charging/discharging experimental results is illustrated in FIG. 5.

Initial efficiency was calculated by Equation 1 below.

Initial efficiency [%]=[discharge capacity at $1^{st}$ cycle/charge capacity at $1^{st}$ cycle]×100      <Equation 1>

TABLE 1

| | Capacity [mAh/g] | Initial efficiency [%] |
|---|---|---|
| Example 5 | 655 | 91 |
| Comparative Example 5 | 625 | 86.5 |

As shown in Table 1, it can be confirmed that the half-cell of Example 5 has higher capacity and higher initial efficiency than those of the half-cell of Comparative Example 5 including the composite anode active material not including Si coating.

Evaluation Example 3: Electrochemical Characteristic Evaluation (2)

Figure 7:
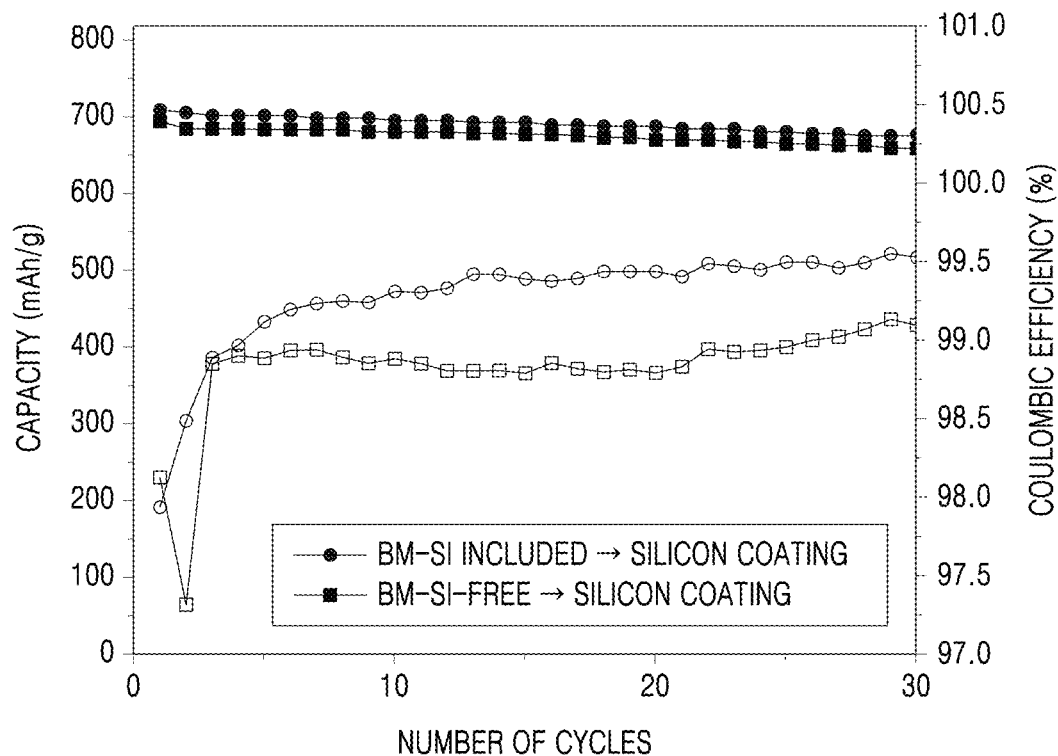
FIG. 7 is a graph showing electrochemical evaluation data of half-cells manufactured according to Example 6 and Comparative Example 6.

A charging/discharging experiment was performed on the half-cells manufactured according to Example 6 and Comparative Example 6 using the same method as that used in Evaluation Example 2, a part of the experimental results is shown in Table 2 below, and a graph showing the charging/discharging experimental results is illustrated in FIG. 7.

TABLE 2

|  | Capacity [mAh/g] | Initial efficiency [%] |
|---|---|---|
| Example 6 | 720 | 88 |
| Comparative Example 6 | 680 | 91 |

Referring to Table 2 and FIG. 7, it can be confirmed that the half-cell of Example 6 including the composite anode active material including both Si nanoparticles and the silicon coating layer has lower initial efficiency, while exhibiting higher Coulombic efficiency due to increased Coulombic efficiency after the initial charging/discharging cycle, as compared to those of the half-cell of Comparative Example 6 including the composite anode active material including only the silicon coating layer.

While example embodiments of the present disclosure have been described with reference to the drawings and examples, these embodiments are provided for illustrative purposes only, and it will be understood by those of ordinary skill in the art that various modifications and equivalents thereto can be made therefrom. Thus, the scope of the present disclosure should be defined by the appended claims.

The invention claimed is:

1. A composite anode active material comprising:
    carbonaceous material;
    a metal alloyable with lithium, located on a surface of the carbonaceous material;
    a dispersant; and
    a silicon coating layer located on a surface of the carbonaceous material, on a surface of the metal alloyable with lithium, on the dispersant, or a combination thereof, wherein the silicon coating layer consists of elemental silicon,
    wherein the metal alloyable with lithium is uniformly distributed on the surface of the carbonaceous material, and
    further comprising a carbon coating layer on an outermost surface of the composite anode active material, wherein the carbon coating layer has a thickness of about 2 nm to about 5 μm.

2. The composite anode active material of claim 1, wherein the dispersant has conductivity.

3. The composite anode active material of claim 1, wherein the dispersant comprises one selected from carbon black, acetylene black, Ketjen black, carbon fibers, vapor-growth carbon fibers, graphite particulates, and a combination thereof.

4. The composite anode active material of claim 1, wherein the carbonaceous material comprises one selected from natural graphite, artificial graphite, hard carbon, soft carbon, and a combination thereof.

5. The composite anode active material of claim 1, wherein the metal alloyable with lithium comprises:
    at least one metal selected from silicon (Si), tin (Sn), aluminum (Al), germanium (Ge), lead (Pb), zinc (Zn), silver (Ag), and gold (Au); an alloy of the at least one metal; an oxide of the at least one metal; a nitride of the at least one metal; an oxynitride of the at least one metal; a carbide of the at least one metal; or a composite of the at least one metal with a carbonaceous material.

6. The composite anode active material of claim 1, wherein the metal alloyable with lithium comprises amorphous silicon particles.

7. The composite anode active material of claim 6, wherein the amorphous silicon particles have a median particle diameter ($D_{50}$) of about 20 nm to about 300 nm.

8. The composite anode active material of claim 1, wherein the silicon coating layer has a thickness of about 3 nm to about 50 nm.

9. A method of preparing a composite anode active material, the method comprising:
    preparing a composite anode active material precursor by mixing a mixture of a carbonaceous material,
    a dispersant, and
    a metal alloyable with lithium; and
    forming a silicon coating layer consisting of elemental silicon on a surface of the composite anode active material precursor;
    wherein the forming of the silicon coating layer is performed by depositing silicon through chemical vapor deposition (CVD) of a silane gas; wherein, in the preparing, the mixture further comprises the dispersant; wherein the metal alloyable with lithium is uniformly distributed on the surface of the carbonaceous material; wherein a carbon coating layer is formed on an outermost surface of the composite anode active material; and wherein the carbon coating layer has a thickness of about 2 nm to about 5 μm.

10. The method of claim 9, further comprising, after the forming, forming a carbon coating layer on an outermost surface of the composite anode active material precursor by providing a carbon precursor onto the composite anode active material precursor and heat-treating the carbon precursor.

11. The method of claim 9, wherein the forming is performed at a temperature of about 400° C. to about 600° C.

12. The method of claim 9, further comprising, before the preparing, ball-milling the metal alloyable with lithium.

13. A lithium secondary battery comprising:
    an anode including the composite anode active material according to claim 1;
    a cathode; and
    an electrolyte.

* * * * *